United States Patent [19]
Bryant

[11] Patent Number: 5,319,269
[45] Date of Patent: Jun. 7, 1994

[54] STATOR WINDINGS FOR ELECTRIC MOTOR

[75] Inventor: Edward W. S. Bryant, Lawrence, Kans.

[73] Assignee: Camco International Inc., Houston, Tex.

[21] Appl. No.: 46,774

[22] Filed: Apr. 13, 1993

[51] Int. Cl.5 .................. H02K 15/10; B05D 5/08
[52] U.S. Cl. ........................... 310/43; 310/42; 310/254; 427/118
[58] Field of Search .............. 310/42, 43, 71, 87, 310/254, 258; 29/596; 427/104, 117, 118; 174/120 R

[56] References Cited

U.S. PATENT DOCUMENTS

| | | | |
|---|---|---|---|
| 2,476,937 | 7/1949 | White | 117/6 |
| 2,749,456 | 6/1956 | Luenberger | 310/43 |
| 3,235,825 | 2/1966 | Davis, Jr. | 333/205 |
| 3,685,926 | 8/1972 | Blum | 417/424 |
| 3,867,658 | 2/1975 | Dochterman | 310/71 |
| 4,219,748 | 8/1980 | Sakaguchi et al. | 310/71 |
| 4,275,319 | 6/1981 | Davis, Jr. | 310/43 |
| 4,749,894 | 6/1988 | Iwata et al. | 310/87 |
| 4,833,354 | 5/1989 | Miller | 310/87 |
| 5,151,561 | 9/1992 | Emery et al. | 174/120 R |

Primary Examiner—Steven L. Stephan
Assistant Examiner—D. R. Haszko

[57] ABSTRACT

A stator structure for an electric motor comprising stator windings formed with conductors coated with an insulation, such as polyetheretherketone (PEEK). At least one portion of such windings has an adhesion-resistant agent, such as a thin coat of mineral oil, applied thereto prior to the application thereto of an immobilization agent, such as a varnish. The adhesion-resistant agent prevents subsequent bending of the windings from damaging the underlying insulation thereon during the manufacture and operation of the electric motor. The prevention of such insulation damage reduces the likelihood of resulting premature motor failure.

7 Claims, 1 Drawing Sheet

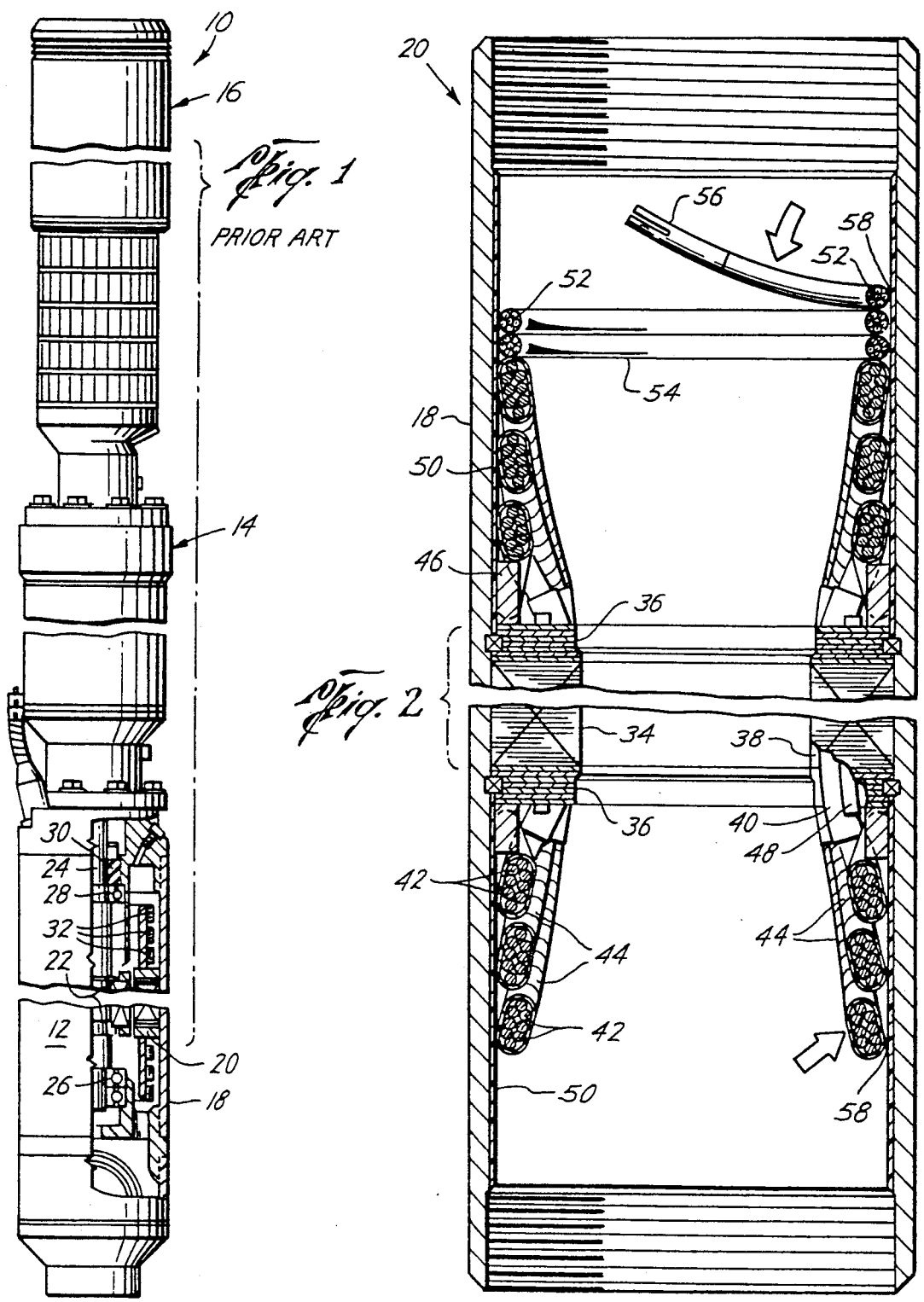

STATOR WINDINGS FOR ELECTRIC MOTOR

BACKGROUND OF THE INVENTION

1. Field in the Invention

The present invention relates to stator windings for use in electric motors and more particularly, to reducing the risk of motor failure caused by damage to the insulation of the stator windings.

2. Relevant Art

During the manufacture of electric motors, lengths of wire, called "conductors", are wound around the stator structure. This winding process usually causes the windings and internal motor leads to be bent into relatively narrow radius curves, which can often times cause the insulation on the conductors to be damaged. This damage is in the form of cracks when the conductors are coated with a hard coating, such as varnish, to immobilize the conductors. When an electric motor is used in a high temperature and/or in a corrosive environment, these cracks in the insulation can cause premature failure of the motor. For example, when an electric motor is used in an electric submergible pump (ESP) that is installed in a wellbore to recover fluids, premature failure of the motor requires the operator to retrieve or pull the failed motor. Such retrievable operations are relatively expensive and time consuming, and the operator suffers lost revenue while the production of the fluids from the well is halted. There is a need for improved stator structure and a method of making same which will reduce the likelihood of such damage to the insulation of the conductors, and thus eliminate or minimize the risk of resulting motor failure.

A commonly used insulation system for ESP electric motors includes insulating sleeves and insulating laminations at opposite ends of the stator, insulating slot liner tubing for the stator windings, multiple layers of insulation on the magnet wire of the windings, insulating tape on the end turns of the windings, insulating sleeves on the connections to the end turns, and an insulating immobilization agent such as varnish or epoxy, that impregnates the stator structure. For example, U.S. Pat. No. 4,275,319, which is commonly assigned hereto, discloses an improved hydrolytically stable varnish for use in an ESP's electric motor to extend the life of such motor. The varnish serves as a moisture barrier to protect the magnet wire insulation from hydrolytic attack. The varnish also serves as a secondary electrical insulation for the electrical conductors of the stator, supports the weight of the stators windings, and encapsulates the end turns of the stator windings so that they are substantially immobilized. In certain instances, a varnish-less motor can be utilized with an ESP when the winding are covered with a particular type of insulation material, usually polyetheretherketone (PEEK) or polyetherketone (PEK), as disclosed in U.S. Pat. No. 4,833,354, which is commonly assigned hereto.

The problem of damage to the conductors' insulation of an ESP motor occurs during the manufacture when the windings are bent into relatively short radius curves, and the motor leads (that extend from each stage of the motor) are bent to make the electrical interconnection means. Once the stator structure has been covered with varnish or epoxy, any further bending of the winding's end turns and the motor leads most likely cause cracks in the varnish. It has been found by the inventor hereof that the typical immobilization agent, such as the varnish or epoxy, adheres or bonds relatively tightly to the exterior surface of the insulation and especially to PEEK or PEK. If stress (ie. bending) and/or tensile forces are applied to the conductors, of sufficient magnitude to cause a crack in the varnish or epoxy, this crack propagates into the insulation because the underlying insulation is subjected to tensile forces from the varnish that tears the insulation to expose the bare magnet wire. These cracks and tears have led to premature electrical failure of electric motors which have necessitated costly retrieval, replacement and repair operations. As described earlier, there is a need for an improved stator winding and a method of making same which will reduce the likelihood of such damage to the conductors' insulation and resulting motor failure.

SUMMARY OF INVENTION

The present invention has been contemplated to overcome the foregoing deficiencies and to meet the above described needs. Specifically, the present invention comprises a stator structure for an electric motor with stator windings formed by conductors coated with an insulation. During the manufacture of the stator structure, selected portions of the windings have an adhesion-resistant agent applied thereto prior to the application of an immobilization agent, such as a varnish or epoxy. This adhesion-resistant agent prevents any cracks in the immobilization agent, caused during manufacture or operation, from cracking or tearing the underlying insulation.

The adhesion-resistant agent is, preferably, a hydrocarbon-based fluid which is either directly or indirectly, applied to all or selected portions of the windings. This adhesion-resistant agent prevents the immobilization agent from adhering to or bonding to the exterior surface of the insulation to such a degree that any stresses therein will not be applied to the insulation in such a magnitude so as to crack or tear the insulation.

BRIEF DESCRIPTION OF THE DRAWINGS

FIG. 1 is a longitudinal partial cutaway view of an electric submergible pump (ESP) including an electric motor with a stator structure of the Prior Art.

FIG. 2 is a longitudinal sectional view of a stator structure, of one preferred embodiment of the present invention, of an electric motor used in an electric submergible pump (ESP).

DETAILED DESCRIPTION OF THE PREFERRED EMBODIMENTS

The present invention comprises a stator structure for use in an electric motor comprising stator windings formed with conductors coated with an insulation. At least one portion of the windings has an adhesion-resistant agent applied thereto prior to the application of an immobilization agent thereto. This adhesion-resistant agent prevents subsequent bending of the windings from damaging the underlying insulation.

For the purposes of the present discussion, the term "electric motor" means any electric motor of any configuration, size and AC/DC type that has insulated conductors in its stator structure. Due to the experience of the inventor hereof, the term will refer, for discussion purposes only, to a multi-stage AC induction motor used within an electric submergible pump (ESP).

For the purposes of the present discussion the term "conductor" means any wire, conduit, tube, or elongated member formed from any electrically-conducting material, and used in a stator structure of an electric motor. It should be noted that the present invention is not limited to this area of technology, but can be used as a coating technology anywhere the prevention of cracking of insulation or coatings is desired. Therefore, conductors, in the meaning of the present invention, can be in the form of fabric, ceramic, metallic, glass, fiberglass, organic, or wooden materials. Further, the conductors can be in any desired cross-sectional configurations, and can be in the form of tubes, pipes, conduits, wires and cable made from any of the above materials.

For the purposes of the present discussion, the term "immobilization agent" means a time, temperature or catalytic agent cured material which is applied, either directly or indirectly, to the exterior of the conductor to increase the rigidity of such conductor. Any desired material can be used as the immobilization agent, such as glue, epoxy, paint, shellac, and varnish. Preferably, the immobilization agent for use within an ESP's electric motor is a varnish or epoxy, and most preferably of the type described in U.S. Pat. No. 4,275,319. It should be understood that the immobilization agent need not encapsulate, shroud, cover or be applied to all of the circumference or length of the conductor but only to those areas thereof where it is desired to increase the rigidity of the conductor. For example, in the case of an ESP's electric motor it is customary to have the varnish cover or impregnate the entire stator structure; however, only end portions need be so coated, as desired.

For the purposes of the present discussion, the term "adhesion-resistant agent" means a material capable of preventing or limiting stress forces in the immobilization agent from extending to an underlying insulation on the conductor with a magnitude sufficient to exceed its limit of adhesion or bonding to the conductor. For example, when an insulated conductor that is coated with the immobilization agent is bent during manufacture, transportation and operation of the stator structure, any cracking, pulling, tearing or disbonding of the insulation should be prevented or, at the least, minimized. Obviously, not all such cracking and damage to the insulation can be prevented when a conductor is repeatedly and/or unreasonably bent to too short of a radius; however, the present invention is intended to prevent damage to the underlying insulation when the conductors are bent during intended manufacture, transportation and operation. Examples of such adhesion-resistant agents for use within the present invention are solid, liquid, gel and/or gaseous forms of non-stick materials. Preferable materials are single constituents or mixtures of mineral oils, vegetable oils, animal oils and petroleum by-products. Cellulose esters, as disclosed in U.S. Pat. No. 2,476,937, can also be used. These adhesion-resistant agents can be sprayed, wrapped, brushed or dipped, each either directly or indirectly, onto the exterior of the insulation, or the adhesion-resistant agent can be impregnated into the insulation or applied thereto during the manufacture of such insulation.

For the purposes of the present discussion, the term "insulation" means any material that coats a conductor for beneficial purposes. For example, insulations suitable for magent wire conductors used in electric motors include polyetheretherketone (PEEK), polyetherketone (PEK), polybenzimazole (PBI), polyethersulfone (PES), fluorinated polyimides, polyamidimide (such as Amoco Chemical's TORLON) a polyimide, such as E. I. Dupont de Nemours' NYLON, polyester, PVC, epoxy, tetrafluoroethylene (TFE), fluorinated ethylene propylene (FEP), perfluoroalkoxy (PFA), polypropylene, and polyphenylene sulfide.

To aid in the understanding of the present invention, the following detailed discussion of the preferred embodiments of the present invention is made in reference to FIGS. 1 and 2. A typical electric submergible pump (ESP) 10, within which the present invention can be employed, is shown in FIG. 1. The ESP 10 comprises an oil-filled, multi-staged, induction electric motor 12, a motor protector 14 used to permit thermal expansion of the motor oil, and a centrifugal pump 16. The electric motor 12 comprises a tubular metal housing 18, a stator structure 20 mounted within the housing 18, and a rotor 22 with a rotor shaft 24 mechanically interconnected to the pump 16. The rotor 22 is supported for rotation coaxially within the stator 20 by means of bearings 26 and 28. The electric motor 12 is sealed against intrusion of foreign agents and fluids by one or more seals 30.

Windings 32 of the stator structure 20, shown in FIG. 2 in greater detail, include a plurality of "stack" of laminations 34 bounded at opposite ends thereof by electrically insulated laminations 36. The laminations 34 and 36 are performed to provide longitudinal slots, such as slot 38, spaced about the circumference of the stator. Each slot 38 can contain a slot liner 40, which can be in the form of a thin walled tubing. Insulated magnet wire conductors 42 are inserted in the slot liners 40 to form the stator windings 32. A woven glass cloth tape 44 binds the conductors 42 together to form a relatively structure that will resist the electrical and mechanical forces exerted on them during operation of the electric motor 12.

One or more blocks 46 can be used as mechanical aids to provide the desired curvature of end turns of the conductors 42; likewise wedges 48 can be used to mechanically hold the windings 32 in the slots 38. Electrically insulating sleeves 50 line the interior of the ends of the housing 18 and separate the end turns from the housing 18. Internal motor lead wires 52, electrically insulated with tubings 54, are soldered or otherwise connected to the conductors 42. A connector 56 at the end of the lead wires 52 connects the stator windings 32 to a power cable (not shown) in communication with an electrical power source.

The present invention finds its application during the winding process of the stator structure 20 and/or thereafter but prior to the application of an immobilization agent, such as the typical impregnation of the stator structure 20 with varnish or epoxy. Specifically, in such winding process, the insulated magnet wire conductors 42 are wound preferably continuously, through the slot liner 40 and stator slots 38 to form bundles of conductors that constitute the stator coils. Bundles of the conductors are wrapped helically with tape to from end turns, and this process is repeated until the end turns of the coils are secured by blocks and/or tape. Wire or string made from a polyamide, such as E. I. Dupont's Nemour's N.Y. or other high temperature polymeric materials, is used to tie the motor leads 52 in position during the assembly of the motor so that they do not come into contact with the rotating shaft 24. The interior of the stator structure 20 is then impregnated with an immobilization agent, such as varnish or epoxy. After the varnish or epoxy has hardened, the end turns may be and the motor leads 52 must be handled to make interconnection with the power cable. This handling causes stresses in the varnish or epoxy which results in undesired stress cracks. This stress can cause the underlying insulation on the conductors 42 to become torn or crack.

To prevent this cracking, an adhesion-resistant agent 58 is applied, in accordance with the preferred embodiments of the present invention, before, during or after the winding of the motor but prior to the varnishing or epoxying of the stator structure. The adhesion-resistant agent is sprayed, wrapped, wiped, brushed or dipped onto the exterior of the insulation of at least one portion of the conductors 42 forming the windings 32. Preferably this adhesion resistant agent 58 is sprayed or wiped onto the end turns and, most preferably, onto the motor leads 52 prior to varnishing, as indicated by the bold arrows in FIG. 2. Alternately, a preferred embodiment of the present invention has a carrier, such as cloth or glove coated or impregnated with such adhesion-resistant agent, and an operator either manually or through the assistance of a machine, wipes the selected areas with the cloth or glove during or after the winding process. It is imported that all outer surfaces of the insulation be contained in a uniform manner. Thereafter, the varnishing of the electric motor proceeds as has been done before.

It is found to be critical that only a relatively thin coating or film of such adhesion-resistant agent should be applied because too great of a thickness of such adhesion-resistant agent i.e., sufficient to form drips or sags, will cause the subsequent application of the epoxy or varnish to not sufficiently adhere. Again, it is the intention of the present invention for the varnish to be bonded relatively lightly to the insulation, or to not be bonded thereto but still encapsulate the insulation, to provide the desired immobilization and thermal insulation without any cracks in the varnish or epoxy causing damage to the underlying insulation.

Whereas the present invention has been described in particular relation to the drawings attached hereto, it should be understood that other and further modifications, apart from those shown or suggested herein, may be made within the scope and spirit of the present invention.

What is claimed is:

1. A stator structure for use in an electric motor comprising stator windings formed from a plurality of conductors coated with an insulation, at least one portion of each of the insulated conductors coated with an adhesion-resistant agent, and the at least one portion of each of the coated insulated conductors coated with an immobilization agent, whereby the adhesion-resistant agent prevents any cracks in the immobilization agent from damaging the underlying insulation.

2. The stator structure of claim 1 wherein the electric motor is a multi-staged induction motor for use in an electric submergible pump (ESP).

3. The stator structure of claim 1 wherein the insulation is selected from the group consisting of polyetheretherketone (PEEK), polyetherketone (PEK), polybenzimazole (PBI), polyethersulfone (PES), fluorinated polyimide, polyamideimide, polyamide, polyester, PVC, epoxy, tetrafluoroethylene (TFE), fluorinated ethylene propylene (FEP), perfluoroalkoxy (PFA), polypropylene and polyphenylene sulfide.

4. The stator structure of claim 3 wherein the insulation is selected from the group consisting of polyetheretherketone, polyetherketon and polybenzimazole 5. The stator structure of claim 1 wherein the at least one portion of the windings having the adhesion-resistant agent applied thereto comprises internal motor leads of the electric motor.

6. The stator structure of claim 1 wherein the adhesion-resistant agent comprises an agent selected from the group consisting of mineral oils, vegetable oils, animal oils, petroleum by-products, silicones, flowable hydrocarbon materials, and mixtures thereof.

7. The stator structure of claim 1 wherein the immobilization agent comprises varnish.

* * * * *